(12) United States Patent  
Fermann

(10) Patent No.: US 6,904,219 B1  
(45) Date of Patent: Jun. 7, 2005

(54) ULTRA HIGH-POWER CONTINUOUS WAVE PLANAR WAVEGUIDE AMPLIFIERS AND LASERS

(75) Inventor: Martin E. Fermann, Franklin, MA (US)

(73) Assignee: Boston Laser, Inc., Binghamton, NY (US)

(*) Notice: Subject to any disclaimer, the term of this patent is extended or adjusted under 35 U.S.C. 154(b) by 186 days.

(21) Appl. No.: 10/205,492

(22) Filed: Jul. 26, 2002

(51) Int. Cl.$^7$ .............................. G02B 6/22; G02B 6/12
(52) U.S. Cl. ................... 385/130; 385/126; 385/146
(58) Field of Search ............................. 385/129–130, 385/146, 126–128

(56) References Cited

U.S. PATENT DOCUMENTS

| | | | |
|---|---|---|---|
| 4,815,079 A | | 3/1989 | Snitzer et al. |
| 4,896,942 A | * | 1/1990 | Onstott et al. ............... 385/127 |
| 5,111,525 A | * | 5/1992 | Hartouni ...................... 385/126 |
| 5,818,630 A | | 10/1998 | Fermann et al. |
| 5,865,865 A | | 2/1999 | Yoshida et al. |
| 6,031,850 A | | 2/2000 | Cheo |
| 6,072,811 A | | 6/2000 | Fermann et al. |
| 6,496,301 B1 | | 12/2002 | Koplow et al. |
| 6,836,606 B2 | * | 12/2004 | Abeeluck et al. ........... 385/125 |
| 2003/0026569 A1 | * | 2/2003 | Eldada et al. ............... 385/129 |

FOREIGN PATENT DOCUMENTS

WO       WO/69313 A1     9/2001

OTHER PUBLICATIONS

Wayne S. Pelouch, et al., "Self–Imaging in Waveguide Lasers and Amplifiers", pp. 1–4, Lafayette, CO.

Raymond J. Beach, et al., "Constant Refractive Index Multi-Core Fiber Laser", pp. 1–3, Livermore, California.

N.S. Platonov, et al., "135W CW Fiber Laser With Perfect Single Mode Output", pp.1–3, Oxford, Massachusetts.

* cited by examiner

*Primary Examiner*—Akm Enayet Ullah  
*Assistant Examiner*—Jerry T Rahll

(57) ABSTRACT

Double clad large mode area planar lasers or amplifiers comprising rare-earth or transition metal doped planar core regions are used to generate near-diffraction-limited optical beams of ultra-high power. The amplified light is guided in the core using different guiding mechanisms in two orthogonal axes inside the core. Waveguiding along a first long core axis is obtained substantially by gain-guiding or thermal lensing. Waveguiding along a second short core axis is obtained by index guiding. This is accomplished by surrounding the planar core region with regions of different refractive index. The long sides of the planar core region are surrounded with a depressed refractive index cladding region. The short sides of the planar core region are surrounded with a cladding region substantially index-matched to the core region. The whole structure is surrounded by an outer cladding region with a low refractive index to enable cladding pumping of the planar waveguide with high-power diode lasers. The rare-earth or transition metal doping level inside the planar core can be constant and can also vary substantially without negatively affecting the waveguiding properties. To avoid bend losses along the long axis of the planar waveguide, the planar core region and the planar waveguide are aligned parallel to each other and the planar waveguide is coiled with the long side of the planar waveguide mounted to a drum. The drum can also be used as a heat sink. A planar waveguide comprising a planar core region can be manufactured using conventional fiber fabrication methods.

22 Claims, 5 Drawing Sheets

ULTRA HIGH-POWER CONTINUOUS WAVE PLANAR WAVEGUIDE AMPLIFIERS AND LASERS

FIELD OF THE INVENTION

This invention relates to ultra-high power continuous wave planar waveguide lasers and amplifiers and more particularly a large mode area flexible planar waveguide.

DESCRIPTION OF THE PRIOR ART

Planar waveguide lasers are currently well established as efficient means of generating high optical power levels from compact packages. Recently, power levels up to 16 W have been obtained from a large mode area planar waveguide laser (W. S. Pelouch, 'Self-Imaging in Waveguide Lasers and Amplifiers', Opt. Soc. Am. Conf. On Advanced Solid State Lasers, Quebec City, (2002), paper MA2-1). However, such planar waveguides. are generally very short (i.e., of the order of a few cm) and relatively non-flexible. Therefore, very high pump power absorption is required in these structures, thereby limiting power scalability.

Alternatively, over the last several years fiber lasers have been established as one of the most efficient means for converting electrical to optical energy. Average powers up to 135 W powers are now readily available from optical fiber amplifiers and lasers (N. S. Platonov et al., Conference on Lasers and Electro-Optics, Long Beach, (2002), paper CPDC3) with further power scaling to the kW range being well within the physically possible realm.

However, because of the susceptibility of optical fibers to backward stimulated Brillouin scattering, the generation of single-frequency signals is very ineffective in optical fibers and, to date, the maximum achieved power level is limited to only about 25 W. The wide-spread use of fiber amplifiers or lasers in high power single-frequency amplification and generation thus requires an increase of the fundamental Brillouin threshold. The Brillouin threshold can be effectively increased by increasing the fiber modal area, i.e., the area of the fundamental mode propagating in the fiber.

Indeed, three different approaches have been suggested for increasing the fiber modal area. In a first approach, the area of the fundamental mode can be increased by using a relatively large core multimode fiber (Fermann et al., U.S. Pat. No. 5,818,630). However, the use of large core multimode fibers is limited by the increased susceptibility of large mode fibers to mode-coupling, which results in a reduced mode-quality. As an alternative, large core single-mode fibers can also be used to increase the modal area (Fermann et al., '630). However, the use of large core single-mode fibers is limited by their increased susceptibility to bending losses. Indeed the present limit in mode size achievable with either single-mode or multi-mode fibers is around 50 μm for either case. Equally, fiber bending can be used to preferentially attenuate higher-order modes (Fermann et al., U.S. Pat. No. 6,072,811) and to obtain single mode operation. The same concept has later been reiterated (Koplow et al., World patent 01/69313 and U.S. patent application Ser. No. 09/523, 215, filed Mar. 10, 2000). However, severe bending of optical fibers can have negative implications on fiber lifetime, especially for large diameter fibers and thus fiber bending cannot be considered for the construction of large-mode, ultra high-power fiber lasers.

In a second approach, the fundamental mode area is increased by using coherent coupling in circular multi-core fibers (Cheo, U.S. Pat. No. 6,031,850) to generate one large supermode. However, multi-core fibers are difficult to manufacture and moreover, mode-coupling between various allowed supermodes results in a degradation in mode quality and severely limits the scalability of this approach.

In a third approach, multi-core ribbon fibers have been suggested to allow for stable propagation of super-modes (R. Beach et al., 'Constant Refractive Index Multi-Core Fiber Laser', Opt. Soc. Am. Conf. On Advanced Solid State Lasers, Quebec City, (2002), paper MA3). However, circular as well as ribbon multi-core fibers are susceptible to modecoupling, severely limiting the maximum achievable mode size. To date a mode size exceeding 50 μm has not been achieved in either of these approaches.

Accordingly, to date, no large mode area planar waveguide combined with a flexible optical fiber symmetry has been demonstrated.

SUMMARY OF THE INVENTION

Double clad large mode area planar lasers or amplifiers are used to generate near-diffraction-limited optical beams of ultra-high power. The planar lasers and amplifiers comprise a planar core region doped with a rare-earth material or transition metal. The planar core comprises two orthogonal axes of different length. Waveguiding along a first long planar core axis is obtained substantially by gain-guiding or thermal lensing. Waveguiding along a second short planar core axis is obtained by index guiding. To achieve these non-degenerate waveguiding properties along the two orthogonal planar core axes, the planar core region is surrounded with regions of different refractive index along the two axes. The long sides of the planar core region are surrounded with a depressed refractive index cladding region. While, the short sides of the planar core region are surrounded with a cladding region index-matched to the planar core region. The whole of the cladding region is surrounded with a second cladding region, where conveniently, this second cladding region is also index-matched to the planar core region. The whole structure is surrounded by a third cladding region with a low refractive index to enable cladding pumping of the planar waveguide with high-power diode lasers.

The rare-earth or transition metal doping level along the long planar core axis is preferably constant. However, a parabolic variation or more complex variations of the rare-earth or transition metal doping level along the long planar core axis can also be employed.

To avoid bend losses along the long axis of the planar waveguide, the planar waveguide is preferentially coiled along the short second axis; i.e., the planar core region and the surrounding planar waveguide are aligned parallel to each other and the planar waveguide is coiled with the long side of the planar waveguide mounted to a drum. The drum can also be used as a heat sink.

A planar waveguide comprising a planar core region can be manufactured by repetitive grinding, oversleaving and fusion of conventional step-index fiber preforms.

A planar laser may be constructed by pumping with a high-power diode laser and providing feedback between two mirror structures at the ends or inside of the planar waveguide.

A planar amplifier may be constructed by pumping with a high-power diode laser and injecting an optical signal source into one end of the planar core.

DESCRIPTION OF THE PREFERRED EMBODIMENT

Figure 1:
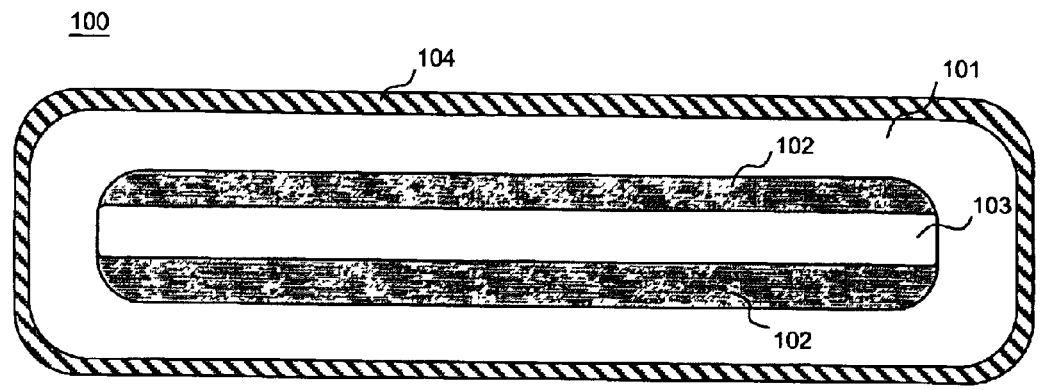
FIG. 1 is a diagram of a flexible planar waveguide cross section according to a first embodiment of the invention.

The cross section of a planar waveguide 100 according to an embodiment of this invention is shown in FIG. 1. In the following we refer to a planar waveguide simply as 'planar'. The planar comprises a silica cladding 101, a depressed index cladding region 102, an index-matched parabolic gain profile rare-earth-doped planar core region 103 and a low refractive index outer coating (or cladding) 104. Though rare-earth-doping of the core region is preferred to produce a gain profile, doping with transition metals can alternatively be employed to produce a core region with a gain profile. For convenience we refer to the long planar axis as the a-axis and the short planar axis as the b-axis. Generally, rare-earth materials such as Nd, Yb, Er, Er/Yb, Tm, Ho or Pr or transition metals such as Cr or Ti are used as dopants to obtain gain in planar core region 103.

Low refractive index outer coating 104 is based on a Fluor-containing polymer and can also comprise Teflon, which provides a greatly enhanced resistance to thermal damage. Depressed index cladding region 102 of planar 100 is typically doped with fluorine or boron. The rare-earth planar core region 103 is further index-matched to silica cladding 101 by co-doping planar core region 103 with an appropriate amount of boron or fluorine to compensate for the refractive index increase by the rare-earth or transition metal dopant.

Figure 2A:
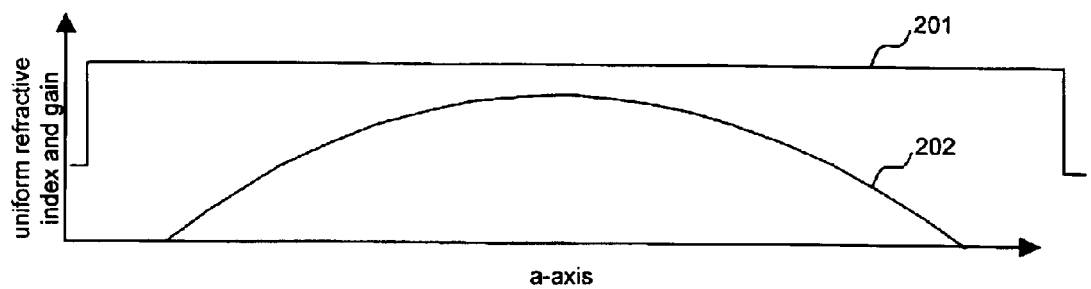
FIG. 2A is a diagram of the refractive index and gain profiles along the "a" axis of a planar waveguide according to the first embodiment of the invention.
Figure 2B:
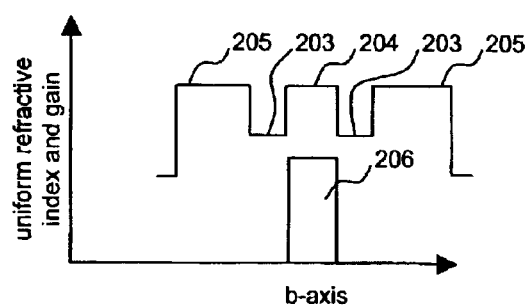
FIG. 2B is a diagram of the refractive index and gain profiles along the "b" axis of a planar waveguide according to the first embodiment of the invention.

Exemplary refractive index and gain profiles of the planar from FIG. 1 along the a- and b-axes (i.e., long and short planar axes, respectively) are shown in FIGS. 2A and 2B respectively. Along the a-axis the refractive index profile 201 is essentially a constant, apart from the reduction of the refractive index at the outer cladding. Along the b-axis the refractive index profile comprises depressed index regions 203 surrounding the planar core region 204 on either side. Regions 205 correspond to the inner silica cladding.

The refractive index profile shown in FIG. 2B ensures that in the direction of the b-axis, the mode is guided by conventional index guiding. Conventional index-guiding is characterized with a core refractive index that is higher than the refractive index of a surrounding region, which is the case here. Hence the usable maximum mode size along the first index guided axis is limited to a maximum of 50–100 $\mu$m as is typical of fibers using index guiding. In contrast, the refractive index along the a-axis is substantially constant (as shown in FIG. 2A) apart from the decreased refractive index at the outer cladding. Hence no index guiding occurs along the a-axis. Therefore the mode along the a axis can expand until confinement by gain-guiding along the a-axis occurs. Gain-guiding is facilitated by an approximately parabolic dopant profile of the gain producing dopant element, as shown in FIG. 2A.

Figure 3A:
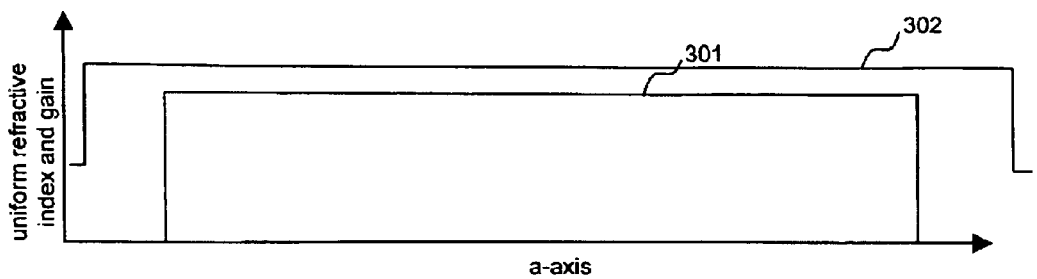
FIG. 3A is a diagram of uniform refractive index and gain profiles along the "a" axis of a planar waveguide according to a second embodiment of the invention.
Figure 3B:
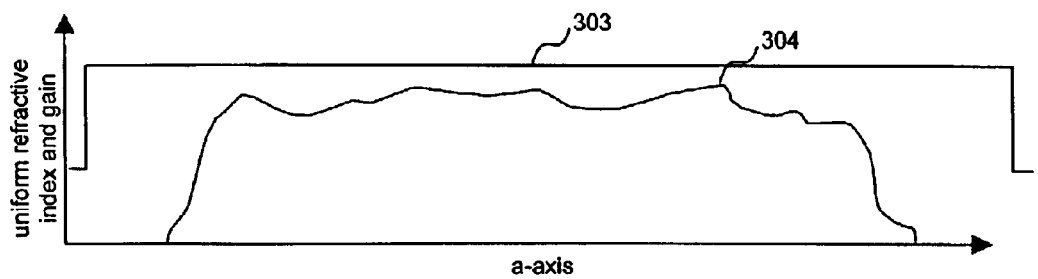
FIG. 3B is a diagram of a uniform refractive index and a non-uniform gain profile along the "a" axis of a planar waveguide according to a third embodiment of the invention.

A parabolic gain profile is well know in laser technology and is sometimes referred to as a Gaussian duct. Though a Gaussian duct allows for efficient gain-guiding, a step-profile gain distribution along the a-axis as shown in FIG. 3A may also be implemented and is easier to manufacture. Generally, the gain distribution along the a-axis does not need to be perfectly uniform; a well-defined gain-guided mode can be supported in a large variety of transverse dopant distributions, as exemplified in FIG. 3B. Though the refractive index is shown to be constant along the a-axis, small variations in the refractive index along the a-axis can be tolerated without adversely affecting the mode-quality. Generally, the larger the gain per unit length, the larger the variations in refractive index along the a-axis that can be tolerated without adversely impacting the mode-quality.

Gain guiding is relatively small in glass-based planar amplifiers and is only observable for large mode sizes>greater than 30 $\mu$m. For typical planars gain guiding produces a fundamental mode between 30 $\mu$m up to several mm in size, depending on the gain per unit length. In circular large mode fibers the onset of gain-guiding thus coincides with the onset of mode-coupling or bend losses and is difficult to exploit efficiently. In a planar as shown in FIG. 1A, however, bend-losses are minimized when bending the planar along the index-guided b-axis. Hence substantial scaling of the mode-size along the a-axis can be achieved without incurring a performance penalty in the form of bend loss.

Moreover, due to the absence of index guided modes along the a-axis, longitudinal mode-coupling is greatly reduced and the guiding properties are only limited by transverse random refractive index variations of the planar. As a result the mode size along the a-axis can be greatly expanded. The overall increase in modal area compared to conventional fiber waveguides can be larger than one order of magnitude, allowing for single frequency amplification at power levels within the kW range.

At these ultra-high power levels, thermal management of the planar amplifiers becomes very critical. The one-dimensional planar approach further allows for one-dimensional heat flow along the b-axis and very effective cooling.

Flexible planar lasers may be produced from conventional circular fiber structures by grinding, oversleaving and fusion as further explained below. A simplified process for manu-facturing of planars uses approximately uniform index and dopant profiles. This manufacturing process is an extension of the techniques used to make rectangular double-clad fibers as described by Snitzer et al. in early work on high power fiber lasers (U.S. Pat. No. 4,815,079 of Snitzer et al.).

Figures 4A, 4B:
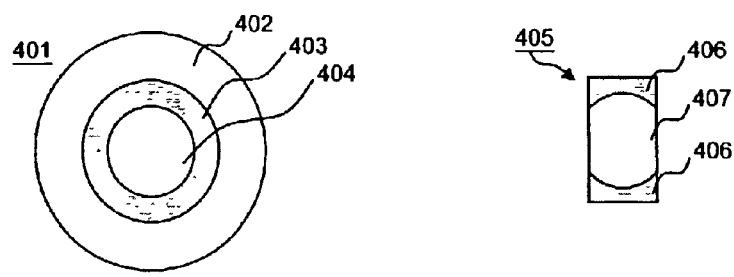
FIGS. 4A–4F are a series of diagrams illustrating fabrication steps for making a flexible planar waveguide according to an embodiment of the invention.

An exemplary process for the manufacturing of a planar is explained with respect to FIGS. 4A through 4E. In a first step a conventional rare-earth-doped fiber preform 401 is fabricated in a silica tube 402 as shown in FIG. 4A. The fiber comprises a core region 404 with a refractive index substantially matched to the silica tube 402 and a depressed index cladding region 403. Alternatively, a conventional fiber can be manufactured in a low index substrate, which has a refractive index lower than silica glass. The growth of a separate depressed index cladding region is then not required. In this case, the refractive index of the core can be higher than the refractive index of the cladding; the core refractive index is then matched to the refractive index of silica by selection of appropriate doping levels for the rare-earth material, fluorine, boron or any other glass-forming dopant material.

After manufacturing the preform, the cladding region 402 is ground away and an approximately rectangular form 405 is obtained, as shown in FIG. 4B. Form 405 comprises regions 406 of depressed refractive index at the top and bottom of core region 407.

Figure 4C:
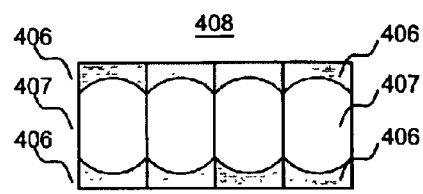

Several such forms are created and positioned next to each other such that the depressed refractive index regions remain at the top and bottom, as shown in FIG. 4C. The resulting rectangular structure 408 already approximates the core region of a planar.

Figures 4D, 4E:
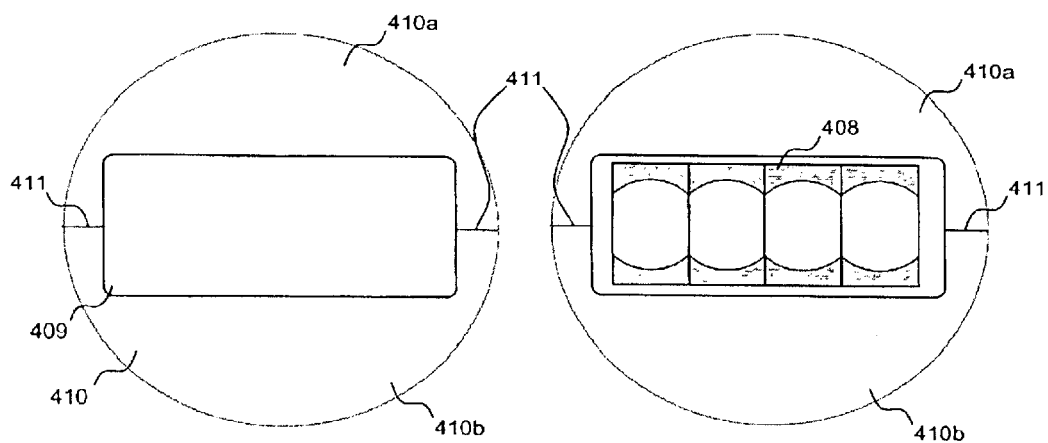

Subsequently, a rectangular central cavity 409 is cut into a large diameter silica rod 410 as shown in FIG. 4D. To simplify this manufacturing step, silica rod 410 comprises two halves 410a and 410b, which are positioned one on top of the other, abutting along line 411 as indicated in FIG. 4D. Optical structure 408 is then inserted into rod 410 as shown in FIG. 4E and the whole assembly is fused together at elevated temperatures permanently joining halves 410a and 410b and securing optical structure 408 in central cavity 409.

Figure 4F:
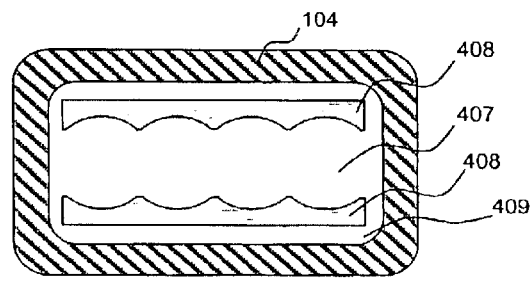

After fusion of the halves, the top and bottom surfaces of preform silica rod 410 are ground off and planar 412 shown in FIG. 4F is obtained. Planar 412 is drawn into a waveguide with a smaller cross section and appropriately coated with a low index material 104 to generate a double-clad structure. Planar 412 approximates the design shown in FIG. 1 apart from a small modulation at the top and bottom of the core boundary, which does not substantially limit the mode size along the long axis of the planar. The modulation at the core boundary can be minimized by cutting thinner rectangular forms 408 from the original fiber 401.

The fabrication process described here is intended to serve only as an example, any other manufacturing method may be employed. The important end result is a planar with non-degenerate waveguiding properties along two orthogonal axes.

Gain guiding is only effective in non-saturated amplifiers. Therefore gain-guiding cannot be easily exploited in the design of high power lasers because they are typically operated in saturation at least in portions of the laser. However, gain guiding can be effectively exploited in flexible planar amplifiers. Moreover, by driving the planar amplifier into saturation near the end of the amplifying region, adiabatic modal expansion occurs, further increasing the output power and mode-size. Since the planar amplifier or laser is operated in a continuous wave mode, self-phase modulation is negligible even at amplified powers in the kW range, hence nonlinear self-focussing in such planar systems can be neglected.

However, any thermal gradients inside the planar affect the waveguiding properties. Even in a planar with a uniform index profile, index guiding along the a axis can be induced by thermal lensing. Because such a mode is essentially self-trapped, mode-coupling to higher-order modes is suppressed and large modal sizes can be obtained. Thermal guiding can be exploited both in planar lasers and amplifiers as well as saturated planar amplifiers. The design of a planar, where thermally-induced index guiding is exploited for the generation of large mode sizes is identical to FIG. 1 and is not separately shown here. Though there are no principal restrictions on the planar dimensions employed in the present design, a preferred maximal extent of the planar is around 1–2 mm to ensure good flexibility of the planar. Even a planar with a fundamental mode size of 20 $\mu$m×1.00 mm is approximately 50 times less nonlinear compared to currently existing near circular fibers.

Figure 5:
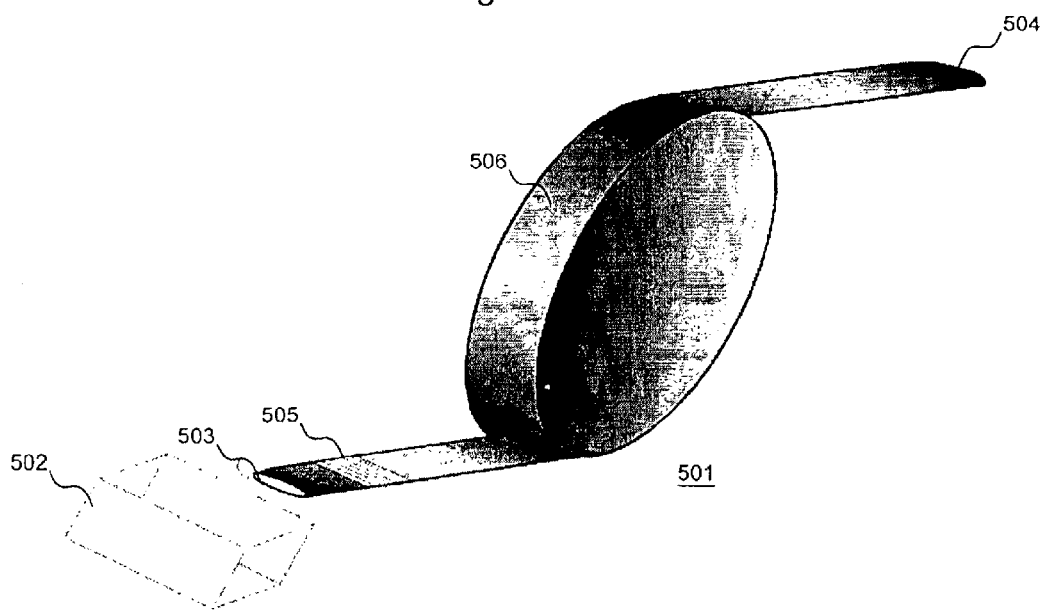
FIG. 5 is a diagram of a generic planar laser according to an embodiment of the invention.

The design of an actual high power planar laser 501 based on thermal guiding at least along one planar core axis is shown in FIG. 5. The planar laser is pumped with a high power diode laser 502, which produces a power up to several kWs in a beam matched to the transverse dimension of the planar cladding. The high power diode laser beam is coupled into the planar through input end 503. Absorption of such high power diode beams induces significant thermal gradients inside the planar, which are exploited to generate and to confine a guided mode along the long axis of the planar. An output is emitted at planar end 504, which is cleaved or polished at an angle of 90° (with respect to the longitudinal planar axis) to provide feedback-at the emission wavelength. A high reflection refractive index grating 505 is directly written into the planar to direct all of the laser light to planar end 504, to select the emission wavelength and to prevent any high power laser light from damaging pump diodes 502. Techniques for writing refractive index gratings directly into optical glasses are well known in the state of the art and are not separately discussed here. The planar 506 is coiled along the b-axis and mounted to a heat sink (not shown) to enable efficient heat dissipation away from the planar. Though, FIG. 5 shows an end-pumped design, side-pumping with fiber couplers attached to the planar or with prisms as disclosed in Snitzer et al. '079 can be equally implemented. Alternatively, V-grooves can be inscribed into the planar to enable side-coupling, as disclosed for circular fiber designs in Goldberg, U.S. Pat. No. 5,865,865. However, the pumping arrangements described here are only to serve as examples and any other means for directing pump light into the cladding of a planar may be implemented. At the planar output end 504, appropriate mode-transforming optics can be inserted (not shown) to transform the elliptical emission pattern from the planar into an approximately circular emission pattern. Such optical elements are well known in the state of the art and are not separately discussed here.

Figure 6:
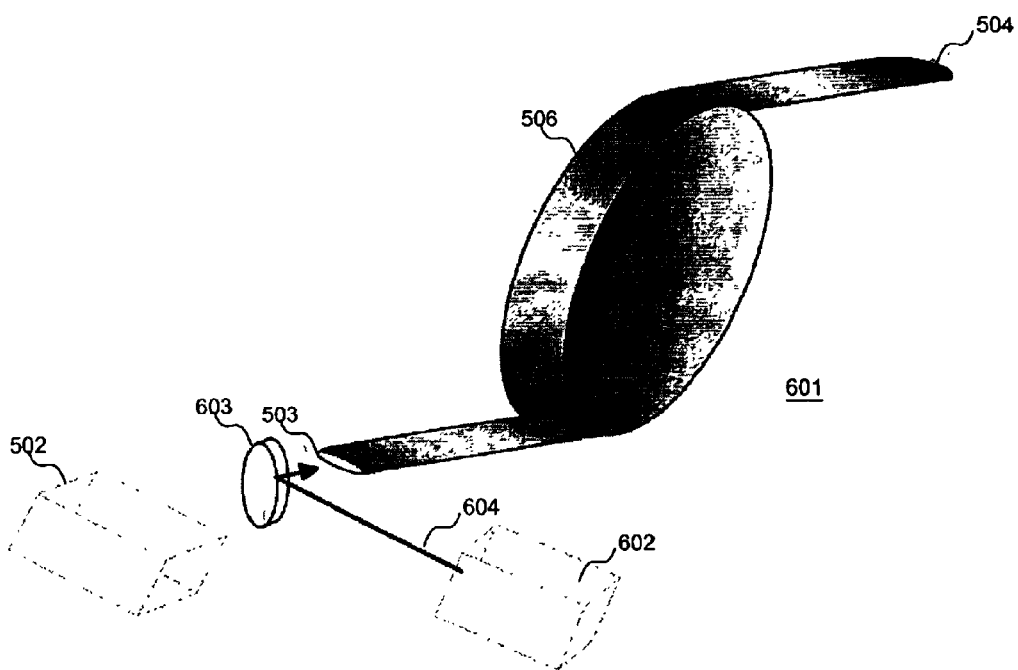
FIG. 6 is a diagram of a generic planar amplifier according to an embodiment of the invention.

The design of a generic planar amplifier is shown in FIG. 6. The design is very similar to a planar laser as displayed in FIG. 5. However, an additional signal source 602, emitting light beam 604, is injected into planar end 503 via an additional beam-splitter 603 inserted between the pump diode assembly 502 and planar end 503. No internal index grating is used. Planar ends 503, 504 are further polished or cleaved at an angle of less than 85° in order to prevent the onset of laser oscillation in the planar amplifier. The beam profile emitted from injection source 602 is preferably matched to the gain-guided mode of the planar using appropriate mode-matching optics (not shown), similar to the mode transforming optics discussed with reference to FIG. 5. However, because the mode is partially defined by gain-guiding, mode-matching is not very critical and a fundamental mode output at planar end 504 can be obtained even with a modal overlap between injection mode and fundamental planar mode of less than 50%. Moreover, thermal guiding can be exploited near planar end 504 to confine the guided mode even in the presence of amplifier saturation.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. Further, it should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

Figure 7:
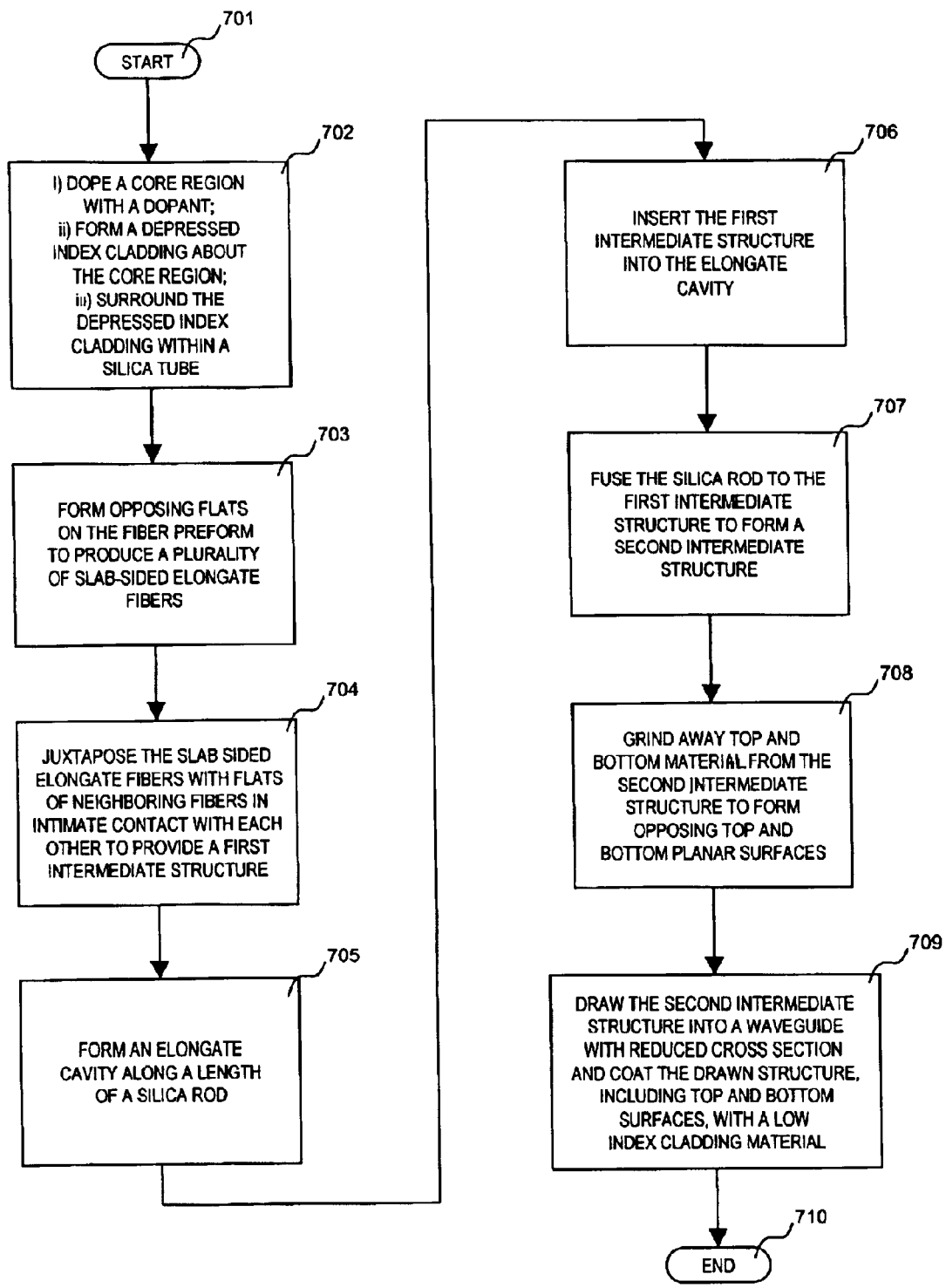
FIG. 7 is a flow diagram of a method according to an embodiment of the invention.

A method according to the embodiment of the invention is depicted in FIG. 7, starting at step 701. At step 702 an appropriate fiber is formed by doping a core region with an appropriate dopant as previously described. A depressed index cladding is then formed about the core region which is then inserted into a silica tube. At step 703, opposing flats are formed on the fiber preform, i.e., the composite fiber formed in step 702, and, as necessary, the preform is sliced to form a plurality of slab-sided elongated fibers. Step 704 juxtaposes the slab-sided elongated fibers, flat side to flat side of neighboring fibers coming in direct contact with each other to provide a first intermediate structure. That is, the flat sides of each of the fiber segments are placed side-by-side so that a central fiber core area is extended horizontally across the individual fibers. At step 705 an elongated cavity is formed along a length of a silica rod and, at step 706, this first intermediate structure is inserted into the elongated cavity. The first intermediate structure as inserted into the silica rod is then fused with the silica rod to form a composite second intermediate structure. Top and bottom material of the intermediate structure is then ground away at step 708 to form opposing top and bottom planar surfaces on the second intermediate structure. Finally, the second intermediate structure is drawn into a waveguide with a smaller cross section and a coating is applied to the second intermediate structure including the top and bottom surfaces, the coating including a low index cladding material, the process terminating at step 710.

What is claimed is:

1. A planar waveguide comprising:
   a doped core region having a first refractive index and substantially elongated along a first axis compared to a second orthogonal axis;
   said core region being embedded in a first cladding region;
   said first cladding region having a refractive index substantially matched to said first refractive index;
   a second outer cladding surrounding said first cladding with a second refractive index lower than said first refractive index;
   a partial third depressed inner cladding region embedded in said first cladding region, having a refractive index lower than said first refractive index;
   the partial third depressed inner cladding region at least partially surrounding and having an intimate contact with said core region comprising gaps located at least at opposite distal ends of said core region along said first axis.

2. A planar waveguide according to claim 1, where said doped core region comprises rare-earth-ions selected from the group consisting of Er, Yb, Er/Yb, Nd, Ho, Tm and Pr.

3. A planar waveguide according to claim 1, further comprising a diode laser configured to provide an optical pump beam and injecting said optical pump beam into said first cladding of said planar waveguide.

4. A planar waveguide according to claim 1, further comprising at least two reflective elements located near opposite distal ends of said planar waveguide.

5. A planar waveguide according to claim 4, wherein said reflective elements are located inside said planar waveguide.

6. A planar waveguide according to claim 4, where said reflective elements comprise combinations of mirrors, fiber Bragg gratings, and bulk diffractive gratings.

7. A planar waveguide according to claim 4, configured to oscillate a light beam between said at least two reflective elements, said light beam guided preferentially by thermal guiding along said first axis and index guiding along said second planar waveguide axis.

8. A planar waveguide according to claim 4, configured to generate an output beam, said output beam being near diffraction limited along two orthogonal axes.

9. An planar waveguide according to claim 8, further comprising a mode-transforming element to circularize said output beam.

10. A planar waveguide according to claim 1, further comprising an external injection laser, operable to emit a light beam, said planar waveguide operable to amplify said light beam.

11. A planar waveguide according to claim 1, wherein said core region and first cladding region are shaped by grinding and joined to said inner cladding region by oversleaving and fusion, manufactured using among others manufacturing techniques such as grinding, oversleaving as well as fusion.

12. A planar waveguide according to claim 1, wherein said core region is doped with a rare-earth-doped core index matched to silica using a step-index preform and encased within a silica substrate tube.

13. A planar waveguide according to claim 1, wherein said core region is doped with a rare-earth-doped core index matched to silica using a step-index preform and encased within a substrate tube having a refractive index less than silica.

14. A planar waveguide according to claim 1 configured to guide a light beam substantially by gain-guiding along said first axis and index guiding along said second axis.

15. A planar waveguide according to claim 1 configured to guide a light beam substantially by thermal guiding along said first axis and index guiding along said second axis.

16. A planar waveguide according to claim 1 configured to guide a light beam substantially by a combination of gain as well as thermal guiding along said first axis and index guiding along said second axis.

17. A planar waveguide according to claim 1, where said doped core region comprises a transition metal dopant.

18. A planar waveguide according to claim 1, where said doped core region comprises a refractory metal.

19. A planar waveguide according to claim 1, where said doped core region comprises a dopant selected from the group consisting of Ti, and Cr.

20. A planar waveguide comprising:
   a doped core region having a first refractive index, said core region elongated in a direction along a first axis;
   an inner cladding region in intimate contact with said core region along a substantial portion of opposing surfaces of said core region extending along said first axis, said inner cladding region having a refractive index value less than a value of said first refractive index;

an intermediate cladding region surrounding and in intimate contact with portions of said core and inner cladding regions, said intermediate cladding region having a refractive index matching said first refractive index; and an outer cladding region surrounding and in intimate contact with an outer surface of said intermediate cladding region, said outer cladding region having a refractive index value less than said value of said first refractive index.

21. A planar waveguide according to claim 20 wherein said opposing surfaces of said core region each comprise a plurality of abutting cylindrical surfaces elongated in a direction perpendicular to said first axis.

22. A planar waveguide according to claim 20 wherein said core region includes opposing upper and lower surfaces in intimate contact with said inner cladding and opposing lateral surfaces perpendicular to said first axis in intimate contact with said intermediate cladding.

* * * * *